United States Patent [19]

Thom, Jr.

[11] Patent Number: 5,469,781
[45] Date of Patent: Nov. 28, 1995

[54] STEAM INJECTION DEVICE FOR A VERTICAL STEAM CONDITIONER

[75] Inventor: Kelsey C. Thom, Jr., Cedar Falls, Iowa

[73] Assignee: Roskamp Champion, Waterloo, Iowa

[21] Appl. No.: 259,082

[22] Filed: Jun. 13, 1994

Related U.S. Application Data

[62] Division of Ser. No. 61,891, May 14, 1993.

[51] Int. Cl.⁶ ............................................. A23N 17/00
[52] U.S. Cl. ..................... 99/516; 99/467; 99/471; 99/483
[58] Field of Search ................... 99/516, 534, 471, 99/467, 323.4, 485–489, 468, 473, 483; 426/506, 507, 511

[56] References Cited

U.S. PATENT DOCUMENTS

| | | | |
|---|---|---|---|
| 1,654,799 | 1/1928 | Forrest | 99/467 |
| 1,713,539 | 4/1929 | Le Claire | 99/471 X |
| 2,299,046 | 10/1942 | West | 99/467 |
| 2,631,099 | 3/1953 | Bonotto | 99/534 |
| 4,185,547 | 1/1980 | Nakazato et al. | 99/453 |
| 4,508,029 | 4/1985 | Malone | 99/516 |
| 4,817,518 | 4/1989 | Wyatt et al. | 99/516 |
| 4,878,422 | 11/1989 | McCullough et al. | 99/323.4 |
| 4,898,092 | 2/1990 | Green | 99/516 X |
| 4,939,988 | 7/1990 | Wyatt et al. | 99/516 |
| 5,033,370 | 7/1991 | Fosbol et al. | 99/471 |
| 5,068,979 | 12/1991 | Wireman et al. | 99/483 X |
| 5,131,321 | 7/1992 | Brummelhuis | 99/471 |
| 5,133,982 | 7/1992 | Bodkin et al. | 99/516 X |
| 5,158,011 | 10/1992 | Chen | 99/584 |
| 5,381,731 | 1/1995 | Thom, Jr. | 99/516 |

FOREIGN PATENT DOCUMENTS

| | | | |
|---|---|---|---|
| 1339780 | 11/1962 | France | 99/471 |

*Primary Examiner*—David Scherbel
*Assistant Examiner*—Patrick F. Brinson
*Attorney, Agent, or Firm*—Robert F. Palermo; Michael H. Minns

[57] ABSTRACT

A steam injection device for a vertical steam conditioning chamber for particulate material has one or more hollow modules having substantially conical tops and open bottoms arrayed along the vertical centerline of the chamber, each supported by at least one hollow leg attached to the chamber wall. Steam for conditioning is supplied to the modules through the support legs by means of a manifold which distributes steam to steam ports in the chamber wall. Additionally, by employing modules having other than symmetrically conical tops, it is possible to impart an irregular flow path to the particles being conditioned in the chamber. This permits uniform exposure of the particles to the steam in the conditioning chamber and, thus, promotes uniform conditioning.

8 Claims, 5 Drawing Sheets

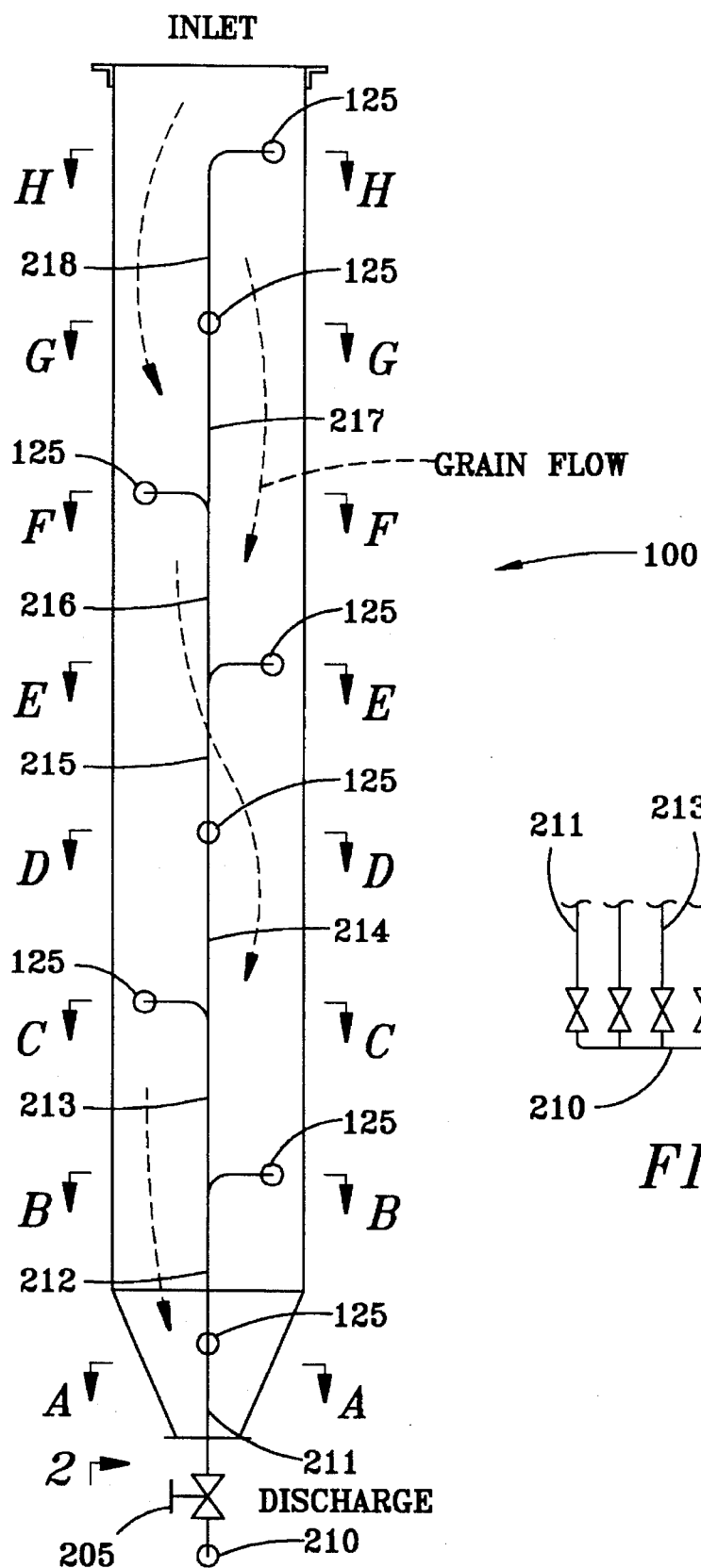
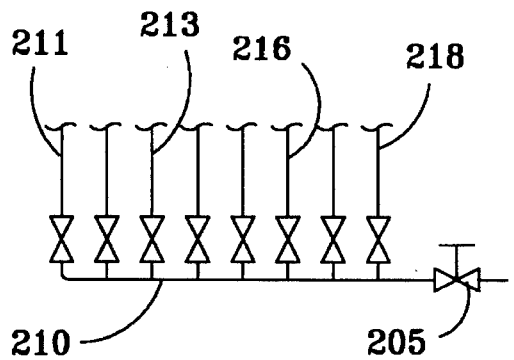
FIG. 2
FIG. 2A 5,469,781

STEAM INJECTION DEVICE FOR A VERTICAL STEAM CONDITIONER

This is a division of application Ser. No. 08/061,891 filed May 14, 1993.

BACKGROUND OF THE INVENTION

This invention relates generally to equipment for processing particulate materials and more particularly to a steam injection housing for a vertical steam conditioning chamber.

Processing of particulate materials such as plastic pellets, feed grains, or other particles frequently requires treatment with steam to heat, moisturize, and possibly soften the particles for subsequent processing. In many cases, this treatment or steam conditioning is accomplished in a vertical chamber in which the steam flows upward in a counterflow direction to the downward flowing feed grains. Typically, steam is introduced at one or more points in the housing through a steam injection nozzle which is often no more than a perforated straight piece or curved piece of pipe mounted within the chamber and connected, through a steam inlet, to a steam manifold and source. In all cases, the form of the injection device is dictated by the geometry of the chamber in order to provide uniform exposure of the particles to the conditioning steam. Perforated pipe injectors, however, have at least one serious shortcoming. They are susceptible to being plugged by partially conditioned moist and soft particles. Another objection to such injectors is that the distribution of conditioning steam across the chamber is not uniform and that some of the particles are not completely conditioned as a result of this nonuniformity. Finally, because of their tubular shape, conventional steam injectors promote bridging of particles which jams the conditioning chamber.

The foregoing illustrates limitations known to exist in present devices and methods. Thus, it is apparent that it would be advantageous to provide an alternative directed to overcoming one or more of the limitations set forth above. Accordingly, a suitable alternative is provided including features more fully disclosed hereinafter.

SUMMARY OF THE INVENTION

In one aspect of the present invention, this is accomplished by providing a steam injection device, for a vertical conditioning chamber for down flowing particulate materials, comprising at least one or hollow module having at least one hollow leg extending outwardly from the module for supporting the hollow module within said conditioning chamber; the leg being connected to a steam port for supplying steam to the hollow module; and steam manifold for delivering steam to the steam port.

The foregoing and other aspects will become apparent from the following detailed description of the invention when considered in conjunction with the accompanying drawing figures.

BRIEF DESCRIPTION OF THE DRAWINGS

FIG. 2 is a fragmentary elevation view of a conditioning chamber illustrating the irregular steam distribution and the irregular flow path of particles through the conditioning chamber.

DETAILED DESCRIPTION

Figure 1:
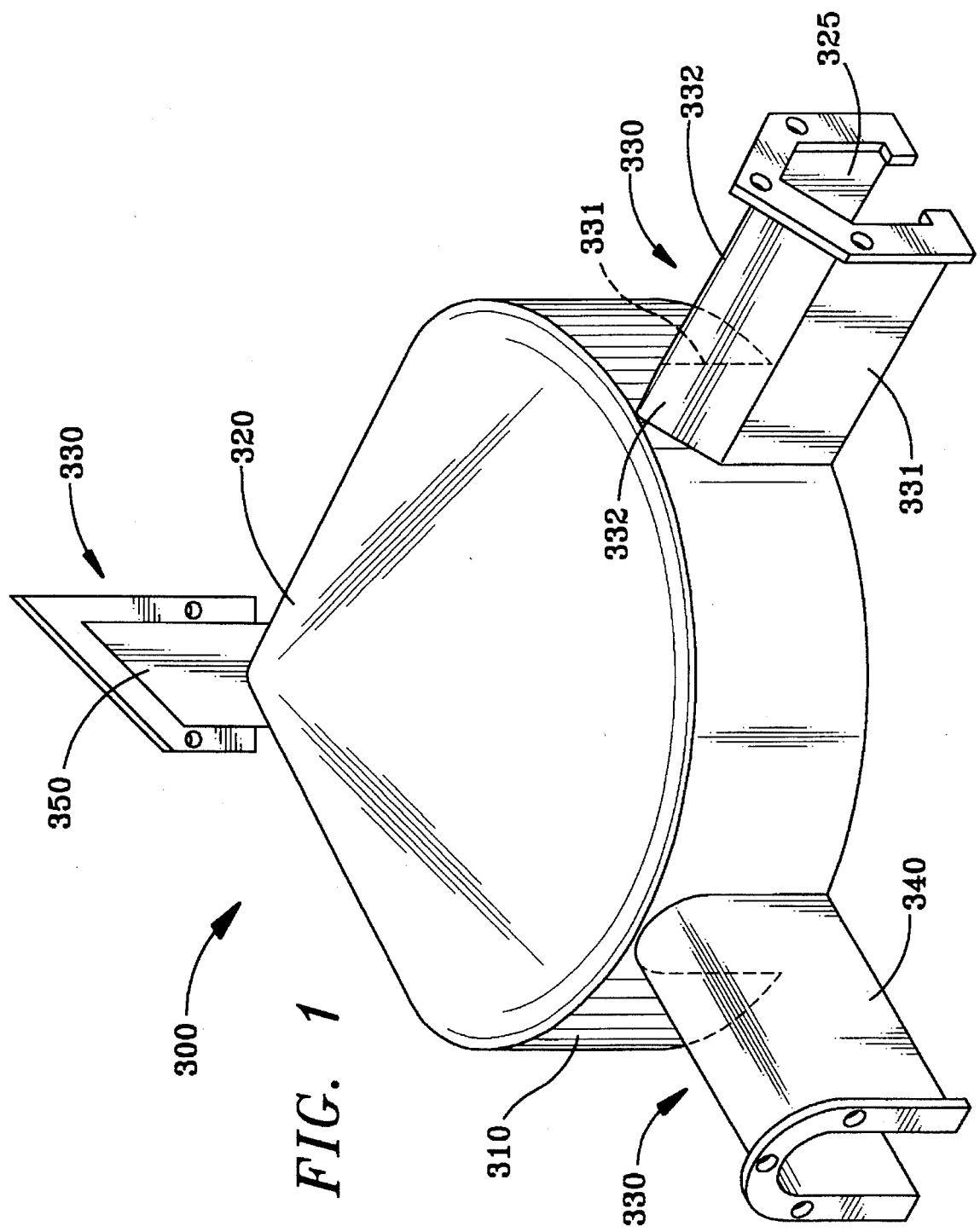
FIG. 1 is a perspective view of one embodiment of the present invention as applied to a round steam chamber and illustrating three different support leg configurations.
Figure 3A:
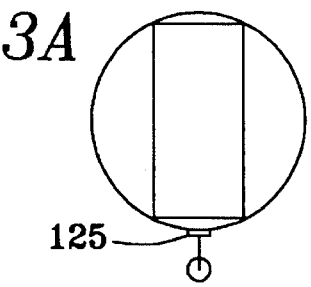
FIGS. 3a–3h illustrate the orientation of the steam injection modules which produces the irregular flow path of FIG. 2.
Figure 3B:
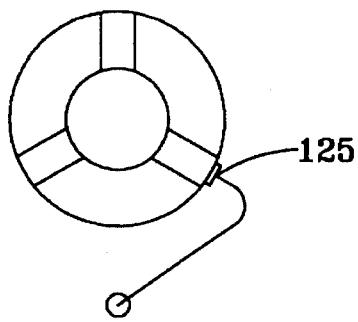
Figure 3C:
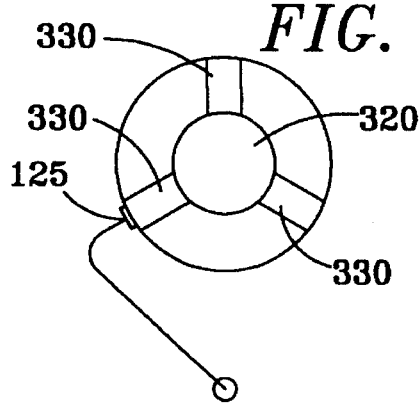
Figure 3D:
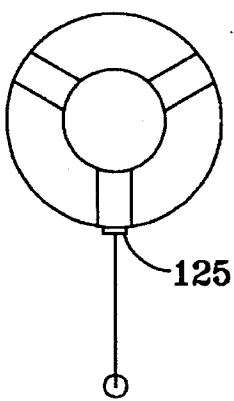
Figure 3E:
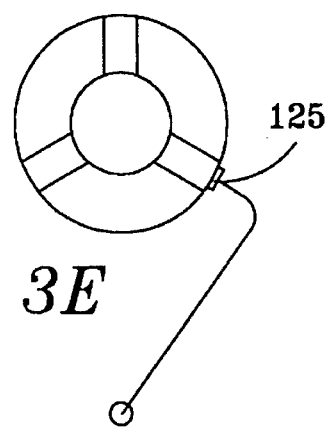
Figure 3F:
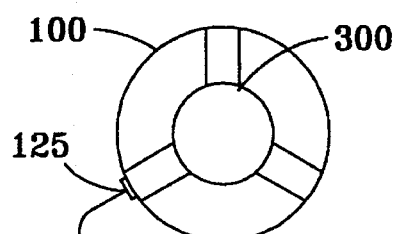
Figure 3G:
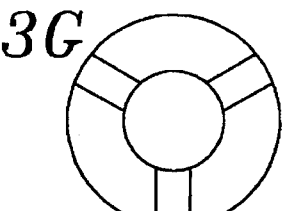
Figure 3H:
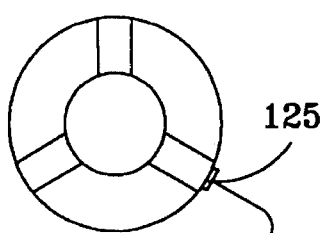

FIG. 1 shows one embodiment of the steam injection module 300 of the present invention. In this example, sidewall 310 is substantially cylindrical, the top 320 is substantially conical and imperforate, while support legs 330 may have any of the three forms shown here—namely, a "U" shape or round top 340, a planar slanted top 350, or a biplanar peaked top 332. It is clear that legs 330 having tops 350 and 332, in their extreme cases, could consist of one vertical side and one slanted side 350, or two slanted sides 332 only. In cross section, these two extremes would resemble a lean to and an A-frame structure, respectively when sidewalls 331 have become vanishingly small.

Support legs 330 serve not only to support module 300 within the conditioning chamber, but also provide a path 325 through which steam can be supplied to the module from the wall of the steam chamber as well as, depending upon the leg profiles or mixtures thereof, deflection of the particles being conditioned as they travel downward past legs 330. It is contemplated that at least one of the support legs has an open bottom as does that portion of module 300 bounded by conical top 320 and wall 310. As particles travel downward through the conditioning chamber they are deflected both radially and tangentially by the modules 300 which are arrayed along the centerline of the chamber. This provides a mixing action to the particles which results in more uniform exposure to the steam escaping outwardly through the open bottoms of the modules. Note that the slanted tops and the conic top are preferably at an angle greater than 45 degrees to the horizontal. This steepness discourages the initiation of bridging and jamming which may otherwise result from particles sticking to upper surfaces of the module.

FIG. 2 and FIGS. 3a–3h further illustrate features of the invention. These figures show a conditioning chamber having steam injection modules at eight different levels. Each module 300 receives a supply of steam through steam inlet port 125 in the wall of conditioning chamber 100. Starting at steam manifold 210 which is controlled by shutoff valve 205, piping 211–218, in this example, extends upward and connects to each steam inlet port 125. Steam conduits 211–218 may be arranged as shown in view A, each conduit extending upward from manifold 210 and each controlled by its own shutoff valve; or each conduit may branch from a single vertical conduit. In the case shown in view A, conduit 211 will require the smallest piping since its run is the shortest of all, while conduit 218 will require the largest diameter. Intermediate conduits may be of intermediate sizes between those of 211 and 218. By this method, a given manifold pressure will provide a relatively constant delivery pressure for the conditioning steam throughout the conditioning chamber. The opposite size requirement is found where conduits 211–218 branch from a single vertical conduit. In this case, conduit 211 has the largest diameter and conduit 218 has the smallest. This is because conduit 211 must carry the full volume of steam required for all steam conduits 211–218, while conduit 212–218 each require progressively smaller diameters since they support a smaller volume flow rate. The pipes branching from the single vertical conduit to the steam inlet ports 125 are all of approximately the same size. Thus, by taking into account the flow resistance of pipes of differing lengths and diameters, it is possible to balance the steam delivery throughout a relatively large conditioning chamber 100 using only a single shutoff valve 205.

The irregular flow path previously described with respect to FIG. 1 results from the varying orientations of the steam injection modules illustrated in FIGS. 3a–3h. As the grain particles flow downward through the conditioning chamber 100 they are constrained to flow around legs 330 supporting module 300. Note that, in this view, legs 330 are seen to project outward from conic top 320 of the module. As a limiting case of the design of module 300, in which wall 310 is reduced to zero height, conic top 320 will constitute the total surface of the open bottomed module. The varying orientations of the modules requires offsetting of steam inlet ports 125 in the surface of chamber 100. It is contemplated that from the upward projecting steam conduits 211–218, feeds may be easily made to steam inlet ports 125 which are offset by 45 degrees to either side of the upwardly projecting steam conduit. Using only straight pipe and standard elbows, it is a simple matter to vary the orientations of the multiple steam injection modules thereby imposing a tortuous irregular path on the downwardly flowing grain particles. This improves the uniformity of conditioning of the particles.

For ease of illustration, the modules of FIGS. 1 and 3 have been shown as having circular cross sections, but it should be understood that, in order to impart an irregular flow path to the particles being conditioned, modifications to such circular cross sections may be employed.

The steam distribution system described in this disclosure provides a previously unavailable versatility to the conditioning chamber. Thus, with a minimum of retrofit, an existing chamber can be adapted for conditioning of anyone of a number of different materials. This is accomplished by the steam injection device of the present invention without unduly restricting the flow, of particles being conditioned, downward through the conditioning chamber. One additional advantage of the well supported steam injection modules of the present invention lies in their ability to provide some weight bearing support and to thereby reduce structural reinforcement requirements for the lower portion of the steam conditioning chamber.

Figure 4:
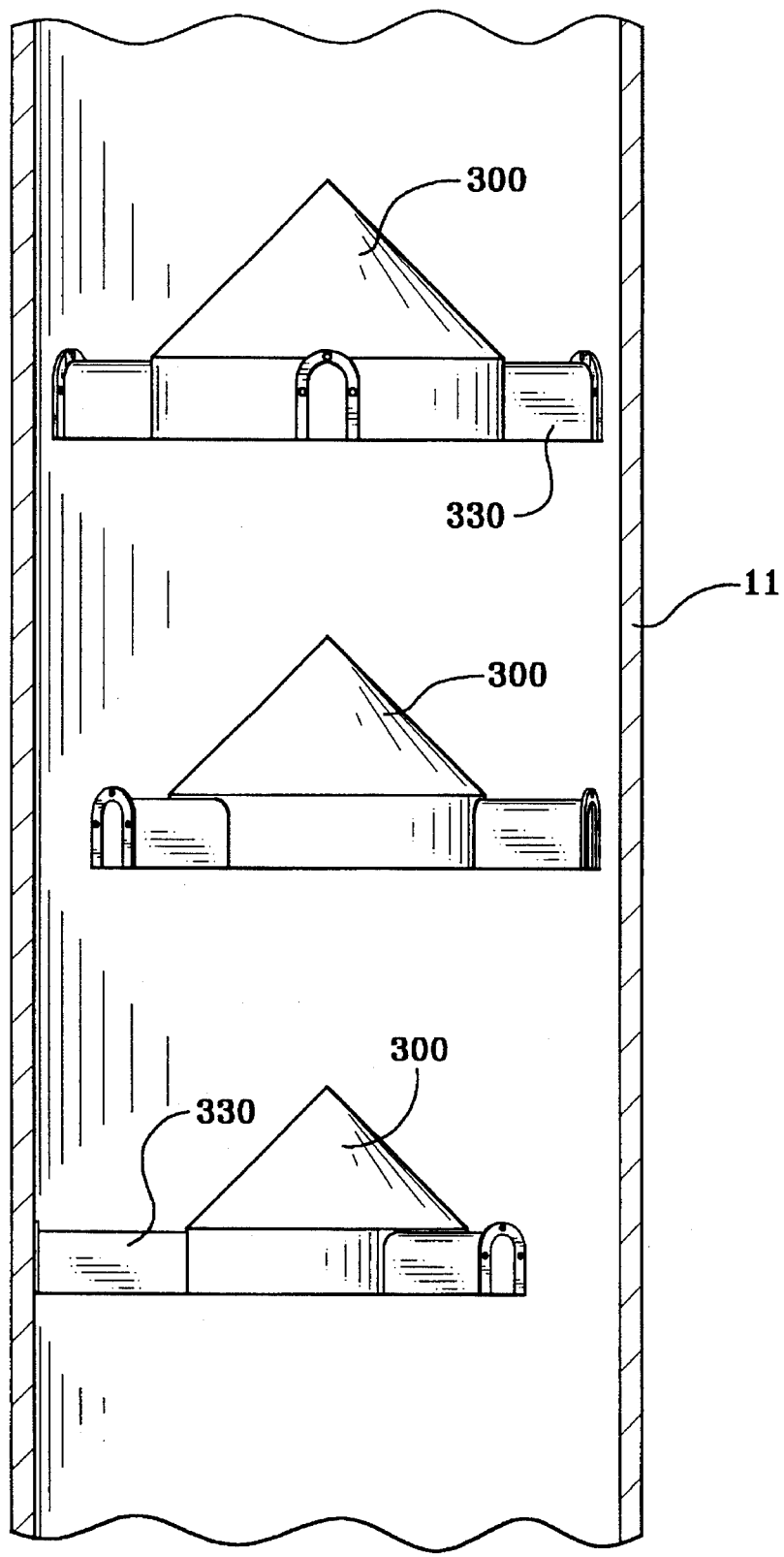
FIG. 4 is a partial cross-sectional view illustrating a further embodiment of the steam injection modules and the conditioning chamber.
Figure 5:
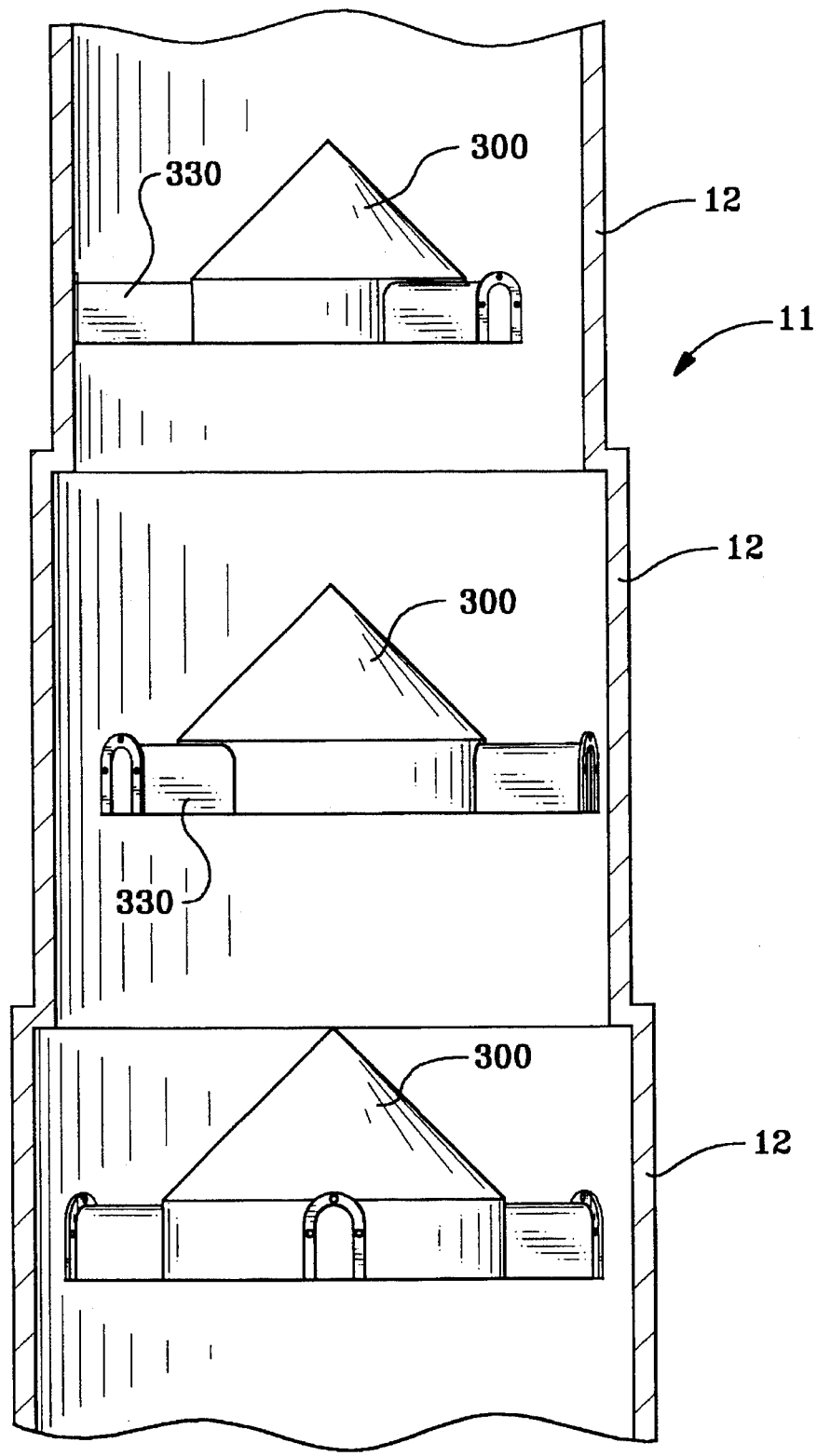
FIG. 5 is a partial cross-sectional view illustrating a further embodiment of the steam injection modules and the conditioning chamber.

FIGS. 4 and 5 illustrate a further embodiment of the steam injection module 300. In both FIGURES, the clearance between the sidewall of each steam injection module 300 and the sidewall of the conditioning chamber 11 increases as the material flows downward. In FIG. 4, the diameter of a steam injection module 300 which is next above it. In FIG. 5, the conditioning chamber 11 is comprised of a plurality of conditioning chamber segments 12 and the diameter of each chamber segment is larger than the diameter of the next chamber segment above it.

What is claimed is:

1. In a vertical chamber for conditioning downflowing feed grains with upflowing steam, the improvement in combination with said chamber for conditioning, comprising:

at least one hollow module means, at the vertical centerline of said vertical chamber, for uniformly distributing steam outwardly from said vertical centerline; said hollow module means having an imperforate top and at least one hollow leg means, extending outwardly from said hollow module means, for supporting said hollow module means; said at least one hollow leg means being connected to a steam port in a sidewall of said vertical chamber for conducting steam from said sidewall to said hollow module means; and a steam manifold for receiving steam from a steam source and for distributing said steam to said steam port in said sidewall of said chamber.

2. The combination of claim 1, wherein the hollow module means has a substantially conical imperforate top surface, an open bottom surface, and at least one aperture for receiving steam into said hollow module means from said at least one hollow leg means.

3. The combination of claim 1, wherein the at least one hollow support leg means has an open bottom surface.

4. In a vertical chamber for conditioning downflowing feed grains and other particulate materials with upflowing steam, the improvement in combination with said chamber for conditioning, comprising:

at least one hollow module means, at the vertical centerline of said vertical chamber, for uniformly distributing steam outwardly from said vertical centerline; said hollow module means having an imperforate top and at least one hollow leg means, extending outwardly from said hollow module means, for supporting said hollow module means; said at least one hollow leg means being connected to a steam port in a sidewall of said vertical chamber for conducting steam from said sidewall to said hollow module means;

a steam manifold for receiving steam from a steam source and for distributing said steam to said steam port in said sidewall of said chamber; and means for causing downflowing particulate material to travel a non-linear path downward through said vertical chamber, the means for causing downflowing particulate material to travel a non-linear path comprising a plurality of said hollow module means wherein the at least one hollow leg means on a hollow module means is angularly offset from the at least one hollow leg means on an adjacent hollow module means.

5. The combination of claim 4, wherein the number of hollow support leg means extending outwardly from each said hollow module means is three.

6. The combination of claim 5, wherein the hollow support leg means are spaced 120 degrees from one another.

7. The combination of claim 4, wherein the angular offset is 45 degrees.

8. In a vertical chamber for conditioning downflowing feed grains and other particulate materials with upflowing steam, the improvement in combination with said chamber for conditioning, comprising:

at least one hollow module means, at the vertical centerline of said vertical chamber, for uniformly distributing steam outwardly from said vertical centerline; and hollow module means having an imperforate top and at least one hollow leg means, extending outwardly from said hollow module means, for supporting said hollow module means; said at least one hollow leg means being connected to a steam port in a sidewall of said vertical chamber for conducting steam from said sidewall to said hollow module means;

a steam manifold for receiving steam from a steam source and for distributing said steam to said steam port in said sidewall of said chamber; and means for stepwise progressively increasing cross-sectional flow area, between said hollow module means and said sidewall of said vertical chamber, from the top to the bottom of said vertical chamber.

* * * * *